(12) United States Patent
Higham et al.

(10) Patent No.: US 9,342,306 B2
(45) Date of Patent: May 17, 2016

(54) PREDICATE COUNTER

(71) Applicant: ANALOG DEVICES TECHNOLOGY, Hamilton (BM)

(72) Inventors: Andrew J. Higham, Edinburgh (GB); Boris Lerner, Sharon, MA (US); Kaushal Sanghai, Brighton, MA (US); Michael G. Perkins, Edinburgh (GB); John L. Redford, Arlington, MA (US); Michael S. Allen, Needham, MA (US)

(73) Assignee: ANALOG DEVICES GLOBAL, Hamilton (BM)

( * ) Notice: Subject to any disclaimer, the term of this patent is extended or adjusted under 35 U.S.C. 154(b) by 462 days.

(21) Appl. No.: 13/963,793

(22) Filed: Aug. 9, 2013

(65) Prior Publication Data

US 2014/0115302 A1    Apr. 24, 2014

Related U.S. Application Data

(60) Provisional application No. 61/717,541, filed on Oct. 23, 2012.

(51) Int. Cl.
| | |
|---|---|
| G06F 9/44 | (2006.01) |
| G06F 9/30 | (2006.01) |
| G06F 9/32 | (2006.01) |
| G06F 9/38 | (2006.01) |

(52) U.S. Cl.
CPC ........ *G06F 9/30072* (2013.01); *G06F 9/30101* (2013.01); *G06F 9/325* (2013.01); *G06F 9/3887* (2013.01)

(58) Field of Classification Search
CPC ....................................................... G06F 9/30
See application file for complete search history.

(56) References Cited

U.S. PATENT DOCUMENTS

| | | | |
|---|---|---|---|
| 5,247,689 A | 9/1993 | Ewert | |
| 5,355,508 A | 10/1994 | Kan | |
| 5,471,592 A | 11/1995 | Gove et al. | |
| 5,815,680 A | 9/1998 | Okumura et al. | |
| 5,903,771 A | 5/1999 | Sgro et al. | |
| 9,092,429 B2 | 7/2015 | Higham et al. | |
| 9,201,828 B2 | 12/2015 | Sanghai et al. | |
| 2002/0016879 A1 | 2/2002 | Miller | |

(Continued)

FOREIGN PATENT DOCUMENTS

| | | |
|---|---|---|
| CA | 002239426 | 12/1999 |
| EP | 0638867 | 8/1994 |

(Continued)

OTHER PUBLICATIONS

Office Action (1st) issued in CN Application Serial No. 201310487400.5 mailed Nov. 23, 2015, 9 pages.

(Continued)

*Primary Examiner* — Cheng-Yuan Tseng
(74) *Attorney, Agent, or Firm* — Patent Capital Group

(57) ABSTRACT

According to an example embodiment, a processor such as a digital signal processor (DSP), is provided with a register acting as a predicate counter. The predicate counter may include more than two useful values, and in addition to acting as a condition for executing an instruction, may also keep track of nesting levels within a loop or conditional branch. In some cases, the predicate counter may be configured to operate in single-instruction, multiple data (SIMD) mode, or SIMD-within-a-register (SWAR) mode.

16 Claims, 2 Drawing Sheets

(56) References Cited

U.S. PATENT DOCUMENTS

| | | |
|---|---|---|
| 2002/0146025 A1 | 10/2002 | Okina |
| 2005/0125636 A1 | 6/2005 | Ford et al. |
| 2006/0090025 A1 | 4/2006 | Tufford et al. |
| 2007/0073923 A1 | 3/2007 | Vemula et al. |
| 2008/0016320 A1 | 1/2008 | Menon et al. |
| 2009/0083524 A1 | 3/2009 | Van Wel |
| 2010/0082894 A1 | 4/2010 | Hsu et al. |
| 2011/0022754 A1 | 1/2011 | Cidon et al. |
| 2012/0054379 A1 | 3/2012 | Leung et al. |
| 2012/0102301 A1 | 4/2012 | Gonion et al. |
| 2012/0210099 A1 | 8/2012 | Gonion et al. |
| 2014/0019719 A1 | 1/2014 | Anand et al. |
| 2014/0115195 A1 | 4/2014 | Higham et al. |
| 2014/0115224 A1 | 4/2014 | Sanghai et al. |
| 2014/0115275 A1 | 4/2014 | Redford et al. |
| 2014/0115278 A1 | 4/2014 | Redford et al. |

FOREIGN PATENT DOCUMENTS

| | | |
|---|---|---|
| EP | 1267256 | 12/2001 |
| EP | 1267256 | 12/2002 |
| EP | 1708090 | 10/2006 |
| EP | 2725485 | 4/2014 |
| KR | 10-1572204 | 11/2015 |
| WO | 2009/158370 | 12/2009 |

OTHER PUBLICATIONS

Notice of Allowance issued for U.S. Appl. No. 14/040,367 mailed Mar. 18, 2015, 8 pages.
English Summary of Preliminary Rejection issued in Korean Patent Application Serial No. 10-2013-126017 mailed Feb. 25, 2015, 3 pages.
Final Office Action issued in U.S. Appl. No. 13/720,624 mailed Mar. 20, 2015, 27 pages.
Extended European Search Report issued for EP 13187959.5 mailed May 15, 2015, 9 pages.
Notice of Preliminary Rejection issued in Korean Patent Application Serial No. 10-2013-118923 mailed May 11, 2015, 4 pages.
English Summary of Notice of Preliminary Rejection issued in Korean Patent Application Serial No. 10-2013-118923 mailed May 11, 2015, 3 pages.
Partial European Search Report in Application No. EP13187959.5-1957 dated Feb. 24, 2014, 6 pages.
Preliminary Rejection issued in Korean Patent Application Serial No. 10-2013-0126826 mailed Jun. 19, 2015, 3 pages.
English Summary of Preliminary Rejection issued in Korean Patent Application Serial No. 10-2013-0126826 mailed Jun. 19, 2015, 1 page.
European Patent Application Serial No. 131894053.7 filed Oct. 18, 2013.
Extended European Search Report issued for EP Patent Application Serial No. 13189405.7 mailed Jul. 9, 2015, 6 pages.
Notice of Allowance issued for U.S. Appl. No. 13/720,624 mailed Jul. 20, 2015, 24 pages.
U.S. Appl. No. 13/720,624, filed Dec. 19, 2012.
Notice of Allowance in Korean Patent Application Serial No. 10-2013-0126017 mailed Aug. 26, 2015.
Office Action (1st) issued in CN Application Serial No. 201310502511.9 mailed Nov. 3, 2015, 12 pages.
Response to Extended Search Report in European Application Serial No. EP13187866 filed Oct. 22, 2014, 19 pages.
U.S. Appl. No. 13/963,793, filed Aug. 9, 2013.
U.S. Appl. No. 14/040,367, filed Sep. 27, 2013.
Non-Final Office Action issued for U.S. Appl. No. 14/040,367 mailed Nov. 14, 2014, 10 pages.
Non-Final Office Action for U.S. Appl. No. 13/720,624 mailed Nov. 24, 2014, 34 pages.
Koren & Krishna, "Fault Tolerant Systems", Part 12, Chapter 4, 2007, Morgan-Kaufman, 11 pages.
Hoffman, Jeff et al., "Architecture of the Scalable Communications Core", Proceedings of the First International Symposium on Networks-on-Chip (NOSC '07), 2007, IEEE, 0-7895-2773-6/07, 10 pages.
Siegel, Howard Jay, "Interconnection Networks for SIMD Machines", Jun. 1979, IEEE, 0018-9162/79/0600-0057800, 75, 9 pages.
U.S. Appl. No. 14/017,301, filed Sep. 3, 2013.
Notice of Allowance issued in Korean Patent Application Serial No. 10-2013-0126826 mailed Dec. 23, 2015, 3 pages.

PREDICATE COUNTER

CROSS-REFERENCE TO RELATED APPLICATIONS

This application claims priority to U.S. Provisional Application 61/717,541, filed Oct. 23, 2012 and entitled "Predicate Counter," which is incorporated by reference in its entirety. Co-pending U.S. application Ser. No. 13/720,624, entitled "Memory Interconnect Network Architecture for Vector Processors," filed Dec. 19, 2012 (the "'624 application") is also incorporated herein by reference in its entirety.

FIELD OF THE DISCLOSURE

The present disclosure relates generally to parallel processing and, more particularly, to a vector processor employing a predicate counter.

BACKGROUND

Parallel processing is often implemented by a processor to optimize processing applications, for example, by a digital signal processor (DSP) to optimize digital signal processing applications. A processor can operate as a single instruction, multiple data (SIMD), or data parallel, processor to achieve parallel processing. In SIMD operations, a single instruction is sent to a number of processing elements of the processor, where each processing element can independently perform the same operation on different data. A growing demand for continually higher throughput and increased performance has also led to SIMD-within-a-register (SWAR), where the processing elements can operate on multiple sets of data within their associated registers. For example, a single 32-bit register may include four 8-bit data, eight 4-bit data, or three 10-bit data, each of which can be operated on in parallel by a single processing element.

Although SWAR is relatively inexpensive to implement in a processor's hardware, SWAR poses challenges from a programming perspective. For example, SWAR programming typically necessitates intrinsics, inline assembly, and/or specialized vector data types (such as float2, int4, short4, etc.) from a high level language such as C/C++, which are not part of the ISO C or C++ standards. Because such programming options (specialized vector data types, intrinsics, and/or inline assembly) are processor specific, SWAR programming presents difficulty in porting legacy code. Further, since SWAR programming adds an additional level of parallel processing on a vector processor, conventional processors burden the programmer with ensuring that the processor recognizes the two levels of parallel operation (two-way parallelism): one level of parallel processing within the processing elements (utilizing SWAR) and another level of parallel processing across the processing elements of a vector unit of the processor. Accordingly, although existing processor architectures for performing parallel processing, and associated methods, have been generally adequate for their intended purposes, they have not been entirely satisfactory in all respects.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
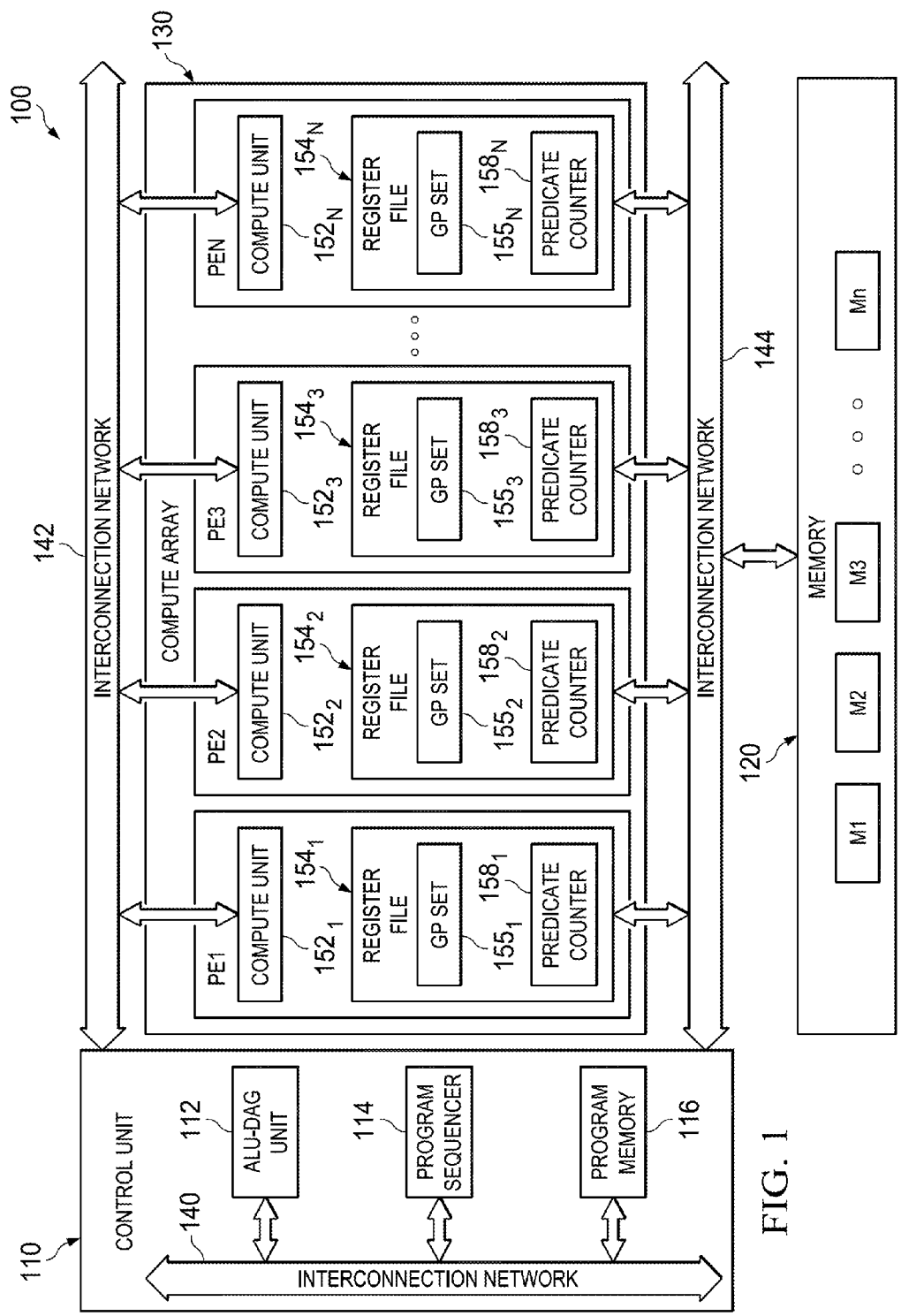
FIG. 1 is a block diagram of an example digital signal processor, including predicate counters.

In one aspect, there is disclosed a processor comprising: a processing element; a sequencer configured to provide a conditionally-executable instructions to the processing element, wherein the condition is provided by a predicate encoded in a predicate counter; and a predicate counter register configured to receive more than two meaningful values and to provide its value as the predicate counter.

In another aspect, there is disclosed a method performed by a computer comprising: receiving an instruction having associated therewith a predicate counter configured to receive more than two useful values; if the predicate counter is a first value, executing the instruction; and if the predicate counter is not the first value, ignoring the instruction.

In yet another embodiment, there is disclosed a tangible computer-readable medium having stored thereon software instructions that, when executed, instruct a processor to: read a predicate counter, the predicate counter having more than two useful values; read a conditional instruction; if the predicate counter is a first value, execute the instruction; if the predicate counter is not the first value, ignore the instruction and manipulate the predicate counter based on the value of the predicate counter.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment may have different advantages, and no particular advantage is necessarily required of any embodiment.

Instruction predication is concerned with linearizing branched operations, which can substantially improve cache performance and instruction pipelining. In a traditional branched topology, a conditional instruction may be of the form:

```
if(condition)
    then branch-A;
else
    branch-B;
```

Because branching to a new location breaks pipelining and memory caches, executing conditional code can be very expensive in terms of clock cycles. Predication ameliorates the effects of branching by linearizing instructions as follows:

```
{predicate: condition} branch-A;
{predicate: !condition}    branch-B;
```

Predicated instructions thus appear inline with each other, but are only executed if the predicate attached to each instruction is true. Predication therefore turns control dependence into data dependence, which enables a processor to execute many operations in parallel without jeopardizing pipelines and cache.

According to an example embodiment of the present disclosure, an integer counter may be used as a predicate to an instruction, thereby encoding both a predicate and a nesting state for the instruction. For example, a particular value such as "0" acts as a predicate to permit the instruction to execute, while any nonzero value indicates that the instruction should not execute.

For purposes of the following discussion, a "predicate counter" is a counter used as a predicate to control execution of an instruction, and unlike a simple Boolean "flag," has more than two meaningful values. A predicate counter can thus encode both a predicate and a nesting state, for example within a nested IF-ELSE-ENDIF structure, or within a nested loop. A unique value can enable the instruction associated with the counter, and all other values thereby indicate that the instruction associated with is disabled at some level of nesting. For example, if the counter is set to zero, an instruction controlled by the counter is allowed to execute normally, otherwise the instruction is prevented from executing. In other example embodiments, the unique value may be, by way of non-limiting example, one, MAXINT (the maximum value of an integer register), −MAXINT (the maximum negative value of a signed integer register), and infinity, negative infinity, and not-a-number, which may be represented by special codes in a register.

A predicate counter is useful both in linearizing instructions, and in single-instruction, SWAR operations, as described in more detail below.

Turning now to the attached figures, FIG. 1 is a schematic block diagram of an example digital signal processor (DSP) 100 according to various aspects of the present disclosure. FIG. 1 has been simplified for the sake of clarity and to better understand the novel concepts of the present disclosure. Additional features may be added in DSP 100, and some of the features described below may be replaced or eliminated in other embodiments of DSP 100.

DSP 100 may include a control unit 110, a memory 120, and a compute array 130. In an example, control unit 110 and compute array 130 constitute a core processor that can perform computation and data processing functions of DSP 100. Some embodiments of DSP 100 include other components, such as a microcontroller for executing microcontroller instructions, a direct memory access (DMA) unit, and various interfaces to off-chip devices. Further, although memory 120 is shown here as a single logical block, those with skill in the art will recognize that memory 120 may include system main memory, various levels of on-chip cache, and/or other volatile or non-volatile memory technologies.

Control unit 110 facilitates program execution of DSP 100. Control unit 110 may include an arithmetic logic unit and data address generation (ALU-DAG) unit 112, a program sequencer 114, and a program memory 116. Control unit 110 may also include other components, such as an instruction cache, a timer, and an instruction register. ALU-DAG unit 112 supports general purpose integer computations and supplies addresses for memory addresses. For example, ALU-DAG 112 provides memory addresses when data is transferred between memory 120 and registers (such as register files of compute array 130, described below). ALU-DAG unit 112 can supply addresses to data memory (for example, memory 120) and/or program memory 116. Program sequencer 114 provides instruction addresses to program memory 116 for instruction fetches. Program memory 116 stores programs that DSP 100 implements to process data (such as that stored in memory 120) and can also store process data. Programs include instruction sets having one or more instructions, and DSP 100 implements the programs by fetching the instructions, decoding the instructions, and executing the instructions. In an example, programs may include instruction sets for implementing various DSP algorithms, including algorithms relying on a predicate counter.

Memory 120 stores information/data to be processed by DSP 100 (data memory), programs implemented by DSP 100 to process the information/data (program memory), or a combination thereof. In the depicted embodiment, memory 120 has a multi-banked interleaved memory structure, such that the memory 120 includes memory banks M1, M2, M3, . . . Mn, where n is a total number of memory banks of memory 120. In an example, memory 120 is a random access memory, such as a static random-access memory (SRAM), dynamic RAM (DRAM), flash or other suitable memory technology. In an example, one or more memory banks M are a separate RAM. Alternatively, in various implementations, memory 120 is another suitable type of memory.

An interconnection network 140, an interconnection network 142, and an interconnection network 144 interconnect control unit 110, memory 120, and compute array 130, thereby providing communication pathways between control unit 110, memory 120, and compute array 130. Interconnection network 140, interconnection network 142, and interconnection network 144 may include a single bus, multiple buses, a crossbar network, a single-stage network, a multistage network, other type of interconnection network, or combination thereof. Control unit 110 issues instructions and data addresses to compute array 130 via interconnection network 142. Interconnection network 142 thus transfers addresses for instructions and data to various processing elements PE of compute array 130 via interconnection network 142. Interconnection network 144 transfers data and/or instructions from memory (such as memory 120, program memory 116, other memory, or combination thereof), such that contents of any register in DSP 100 can be transferred to any other register or to any memory location and memory 120 can provide data operands (values) to compute array 130.

In some embodiments, compute array 130 includes a plurality of processing elements PE1, PE2, PE3, . . . PEN, where N is a total number of processing elements of compute array 130. In an example, compute array 110 may include four processing elements (PE1, PE2, PE3, and PE4). Processing elements PE perform numeric processing, for example for DSP algorithms. Processing elements PE may operate independently, in parallel, or as a SIMD engine. In the present example, each processing element PE may be a vector processor. Alternatively, processing elements PE may be a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract, other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and data interconnection networks (such as interconnection network 144) and stores results. In the present example, register files 154 can include a respective general purpose register set 155 that include general purpose registers having widths dependent on design requirements of DSP 100, such as 32-bit general purposes registers, 40-bit general purpose registers, 64-bit general purpose registers, 128-bit general purposes registers, other width general purpose registers, or a combination thereof. For purposes of the following discussion, general purpose registers 155 include 32-bit general purpose registers. In the present example, register files 154 each include a respective predicate register 158, which may be configured to hold a predicate counter. Register files 154 can include additional registers according to design requirements of DSP 100. Further, in various implementations, predicate registers 158 may be general purpose registers 154 from general purpose register sets 155. In one example embodiment, each PE includes at least one dedicated predicate counter 158 that is 32-bits wide. In other embodiments, each PE may include a plurality of predicate counters.

DSP 100 can perform various parallel operations. For example, during a single cycle, processing elements PE may access an instruction (via interconnection network 142) and access N data operands from memory (via interconnection network 144) for synchronous processing. In SIMD mode, DSP 100 may process multiple data streams in parallel. For example, when in SIMD mode, DSP 100 in a single cycle may dispatch a single instruction to each or a plurality of processing elements PE via interconnection network 142; load N data sets from memory (memory 120, program memory 116, other memory, or combination thereof) via interconnection network 144, one data set for each processing element PE (in an example, each data set may include two data operands); execute the single instruction synchronously in processing elements PE; and store data results from the synchronous execution in memory 120.

In certain embodiments, DSP 100 can also perform SIMD within a register (SWAR), where registers (for example, general purpose registers) of any processing element PE are divisible into more than one processing lane, such that any processing element PE can individually perform parallel operations on their respective processing lanes. For example, in SWAR mode, any processing element PE can perform parallel operations on n lanes, each being k/n bits wide, where k is a width in bits of a register.

Figure 2:
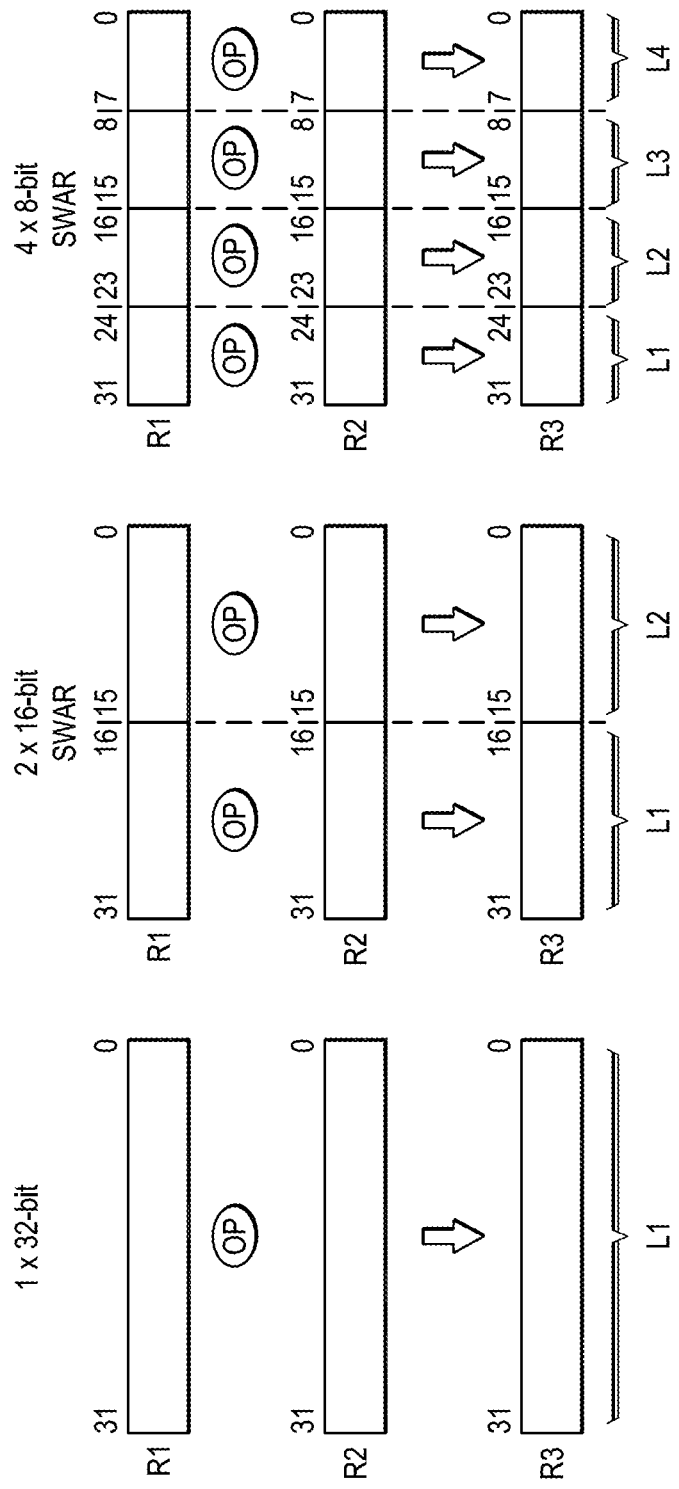
FIG. 2 is a block diagram of registers within a digital signal processor configured to perform SIMD-within-a-register operations.

FIG. 2 schematically illustrates an example set of registers associated with a processing element, such as a processing element PE of DSP 100, that can implement SWAR according to various aspects of the present disclosure. In FIG. 2, a set of registers includes register R1, register R2, and register R3, where an operation OP, such as an addition operation, is performed using elements (data operands) of register R1 and register R2 to produce a result in register R3. Registers R1, R2, and R3 can be general purpose registers, such as from general purpose register sets 155. In the present example, where the general purpose registers are 32-bits wide (k=32), in SIMD mode, any processing element PE can perform an operation on 32-bit elements stored in registers R1 and R2 and place the result in register R3. In furtherance of the present example, in SWAR mode, registers R are divisible into more than one processing lane for parallel operations, such that any processing element PE can perform parallel operations on two lanes (L1 and L2) of 16-bit elements stored in registers R1 and R2 and place the results in register R3 (referred to as 2×16-bit SWAR processing), or parallel operations on four lanes (L1-L4) of 8-bit elements stored in registers R1 and R2 and place the results in register R3 (referred to as 4×8-bit SWAR processing).

A growing demand for a digital signal processor to support high performance for wider data types (such as 64-bit floating point, 32-bit complex, etc.) has led to increasing computation power and register widths within the processing elements of digital signal processors, such as processing elements PE of DSP 100. These wider registers increase digital signal processor performance manifold for smaller data types (such as 32-bit floating point, 16-bit fixed-point, etc.) by implementing SWAR. For example, DSP 100 can execute operations twice to four times as quickly by implementing SWAR without adding more processing elements. In the example where there are four processing elements PE1, PE2, PE3, and PE4 having 32-bit wide registers, DSP 100 can perform four parallel 32-bit operations in SIMD or non-SIMD mode, eight parallel operations in 2×16-bit SWAR mode, or sixteen parallel operations in 4×8-bit SWAR mode in the same amount of time. Similarly, in an example where processing elements PE have 128-bit wide registers, DSP 100 can perform four parallel 128-bit operations in SIMD or non-SIMD mode, eight parallel 64-bit operations in 2×64-bit SWAR mode, sixteen parallel 32-bit operations in 4×32-bit SWAR mode, thirty two parallel 16-bit operations in 8×16-bit SWAR mode, or sixty four parallel 8-bit operations in 16×8-bit SWAR mode in the same amount of time.

Although SWAR mode is relatively inexpensive to implement in hardware, SWAR poses challenges from a programming perspective. For example, SWAR programming typically necessitates intrinsics, inline assembly, and/or specialized vector data types (such as float2, int4, short4, etc.) from a high level language such as C/C++, which are not part of the ISO C or C++ standards. Because such programming options (specialized vector data types, intrinsics, and/or inline assembly) are processor specific, SWAR programming presents difficulty in porting legacy code. Further, since SWAR programming adds an additional level of parallel processing on a vector processor, conventional digital signal processors burden the programmer with ensuring that DSP 100 recognizes the two levels of parallel operation (two-way parallelism): one level of parallel processing within the processing elements (utilizing SWAR) and another level of parallel processing across the processing elements of the vector unit.

Advantageously, as disclosed herein and as further described in the '624 application, an example DSP 100 of the present disclosure enables a programmer (and thus a compiler for DSP 100) to view parallel processing units as a single vector lane, where each processing lane (SWAR lane) is viewed as an individual processing element. In an example where each processing element PE is divisible into a same number of processing lanes, the programmer sees an effective number of processing elements equal to a number of actual processing elements times a number of processing (SWAR) lanes per processing element. Accordingly, in the example where there are four processing elements PE1, PE2, PE3, and PE4 that support four processing lanes (for example, 32-bit wide registers that support 4×8 bit SWAR), from the programmer's perspective (and thus from the compiler's perspective), the effective number of processing elements is sixteen (effective number of PEs=number of PEs×number of SWAR lanes per PE=4×4=16). In another example, where there are eight processing elements and each processing element supports two processing lanes (for example, two 32-bit floating point operations), from the programmer's perspective, the effective number of processing elements is sixteen (effective number of PEs=number of PEs×number of SWAR lanes per PE=8×2=16). As described in more detail in the '624 application, DSP 100 makes SWAR processing (in particular, two-way parallelism) seamless to a programmer by implementing (1) masking on a per processing lane (SWAR lane) basis, (2) conditional execution on a per processing lane basis using for example a predicate counter, (3) performing reduction operations across processing lanes and/or across processing elements, and/or (4) independently generating addresses on a per processing lane basis. Such mechanisms substantially reduce programming effort required for DSP 100.

The following describes various implementations of predicate counters in a processor. For clarity, some logic is provided as example pseudocode. In various examples, the implementations are carried out using concepts and processors as described in Mixed-Signal and DSP Design Techniques by Analog Devices, Inc., hereby incorporated by reference in its entirety. In various examples, the following operations are implemented as machine instructions or part of a machine instruction that also does something else. For instance, setting a counter-predicate could be a side effect of an arithmetic instruction like setting a flag.

In various implementations, a group of predicate counters controls a single instruction, multiple data (SIMD) instruction architecture, where each SIMD lane is controlled by a different predicate counter.

IF-ELSE-ENDIF Structures

In one example architecture, a predicate counter provides control of an IF-ELSE-ENDIF structure. The IF-ELSE-ENDIF structure is controlled by three discrete statements or primitive operations: IF, ELSE, and ENDIF. These are referred to as primitive operations, or primitives, because in some cases, they may not be discrete instructions available to the programmer. Rather, they may be internal operations to other user-accessible instructions. In other cases, they may be user-accessible instructions, though they need not have the specific names defined herein. The three operations are defined as follows:

IF: If depends on both the predicate counter ("Counter" in these examples) and the condition to be tested ("Condition"). If Counter is 0 and Condition is true, no action is taken, meaning that Counter remains 0, which permits the instruction that follows to be executed. Any code that follows will be treated as a "true" branch until a false condition is encountered. For example, Counter will remain at 0 throughout the following three nested "if" statements, assuming that A, B, and C are all true:

```
if(A)
    if(B)
        if(C)
            operation1( );
```

Because Counter remains at 0 in the foregoing example, operation1( ) is executed.

Continuing with the definition of IF, if Counter is 0 and Condition is false, Counter is incremented to 1, meaning that the instruction following will not be executed and a "false" branch has been entered (for example, if A is false in the preceding example "if(B)" and "if(C)" both fall within a false branch, and no code should be executed). In that case, Counter is simply incremented using saturated arithmetic (in other words, Counter is "clamped" at a maximum value on the high end, for example the maximum integer value of the predicate counter, or at 0 on the low end). IF can be written in pseudocode as follows:

```
IF(Counter, Condition){
    if (Counter!=0)
        Counter += 1; // saturating
    else
        if (!Condition)
            Counter = 1;
}
```

ELSE:

Else operates only on Counter. If Counter is precisely 1, then the final level of nesting (if any) in a false branch was reached in the previous instruction, meaning that the "else" condition should be executed (the "if" condition was necessarily not executed, because if it had been executed, Counter would be 0). So Counter is set to 0, which permits the following instruction (i.e., the "else" branch) to execute. If Counter is 0, the "if" branch for this "else" branch was executed (and any subsequent nesting has been unrolled), and this branch should not be executed. So Counter is set to 1, which will prevent execution of the following instruction. If Counter is any other value, it is left alone, and the following instruction will not be executed. ELSE can be written in pseudocode as follows:

```
ELSE(Counter){
    if (Counter==0)
        Counter = 1;
    else if (Counter==1)
        Counter = 0;
}
```

ENDIF:

Like ELSE, ENDIF operates only on Counter. If Counter is nonzero, then this is a nested branch of a false loop, and Counter is decremented. Otherwise, no action is taken. The result of the ENDIF instruction is that nested levels of conditional logic are "unrolled" one at a time as the ENDIF statements are encountered. ENDIF can be written in pseudocode as follows:

```
ENDIF(Counter){
    if (Counter!=0)
        Counter -= 1; // unsigned
}
```

The IF, ELSE, and ENDIF operations appear in the instruction stream with algorithmic instructions predicated by Counter. The positioning of the IF, ELSE, ENDIF operations mark nested control regions.

For example, a simple nested if-else loop may be unrolled with predication. In a traditional non-predicated language, the loop may be written as follows:

```
if(A)
    operation1( );
else{
    operation2( );
    if(B)
        operation3( );
}
```

Thus, if A is true, then only operation1( ) is executed, regardless of B. If A is false and B is true, then operation2( ) and operation3( ) are both executed. If A is false and B is false, then only operation2( ) is executed.

Using the predicated IF-ELSE structure described above, the following table can be constructed.

|  | A&&B | A&&!B | !A&&B | !A&&!B |
|---|---|---|---|---|
| IF (counter, A) predicated op1; | counter = 0 counter = 0 executed | counter = 0 counter = 0 executed | counter = 0 counter = 1 not executed | counter = 0 counter = 1 not executed |
| ELSE predicated op2; | counter = 1 not executed | counter = 1 not executed | counter = 0 executed | counter = 0 executed |
| IF (counter, B) predicated op3; | counter = 2 not executed | counter = 2 not executed | counter = 0 executed | counter = 1 not executed |
| ENDIF; | counter = 1 | counter = 1 | counter = 0 | counter = 0 |
| ENDIF; | counter = 0 | counter = 0 | counter = 0 | counter = 0 |

In other example embodiments, a group of predicate counters may control a SIMD instruction set. In this case, the predicate counters may be set by SIMD-capable IF, ELSE and ENDIF operations. Here, the pseudocode described above is again applied, where "Counter" stands for a group of counters, and Condition stands for a vector of Boolean values.

Stage Loops

In yet another example embodiment, a SIMD stage loop (as disclosed in co-pending U.S. patent application Ser. No. 13/537,731, filed Jun. 29, 2012, titled "Staged Loop Instructions," which is incorporated herein by reference) may be implemented with predicate counters. In this case, a predicate counter group is provided for each stage of the software pipelined loop. Two primitives are provided for SIMD stage loop implementations, namely LOOP and NEXT_STAGE. The LOOP operation is executed before the first instruction in the loop. The NEXT_STAGE operation separates copies of the unrolled loop and is also executed before loop back.

LOOP:

The following pseudocode provides the behavior of the LOOP primitive. As with previous primitives, LOOP may be either a user-accessible instruction, or may be provided intrinsic to other instructions. In the following pseudocode, NUM_LANES indicates a number of processing elements, and COUNTER_GROUPS indicates a number of stages. "Iters" represents the total number of iterations of the loop.

```
LOOP(Iters, Rest) {
    StagesToFinish = ceil(Iters/NUM_LANES) + Rest;
    ItersRemaining = Iters;
    SavedPredCounter = PredCounter[0];
    for (group=NUM_COUNTER_GROUPS-1; group>=1;
                group--)
        for(l=0; l<NUM_LANES; l++)
            PredCounter[group][l] = MAX_COUNTER_VAL;
    lanes_to_enable = min(NUM_LANES,
                        ItersRemaining);
    for (l=0; l < lanes_to_enable; l++)
        PredCounter[0][l] = SavedPredCounter[l];
    for (l=lanes_to_enable; l < NUM_LANES; l++)
        PredCounter[0][l] = MAX_COUNTER_VAL;
    ItersRemaining = ItersRemaining - lanes_to_enable;
}
NEXT_STAGE(BottomOfLoop) {
    for (group=NUM_COUNTER_GROUPS-1; group>=1; group--)
        PredCounter[group] = PredCounter[group-1];
    lanes_to_enable = min(NUM_LANES, ItersRemaining);
    for (l=0; l < lanes_to_enable; l++)
        PredCounter[0][l] = SavedPredCounter[l];
    for (l=lanes_to_enable; l < NUM_LANES; l++)
        PredCounter[0][l] = MAX_COUNTER_VAL;
    ItersRemaining = ItersRemaining - lanes_to_enable;
    StagesToFinish = StagesToFinish - 1;
    if (StagesToFinish > 0) {
        if (BottomOFLoop)
            jump to top of loop;
        }
    else {
        PredCounter[0] = SavedPredCounter;
        // if other counters can be accessed
                //outside loop put them in a known state
        for (group=NUM_COUNTER_GROUPS-1; group>=1;
                group--)
            for(l=0; l<NUM_LANES; l++)
                PredCounter[group][l] = MAX_COUNTER_VAL;
        jump out of loop;
        }
}
```

Individual operations in a SIMD staged loop have stage numbers. In the present example, each stage number indexes a predicate counter group. For example, an unrolled dot product loop might look like the following, where stage counts are given in { }:

```
R3 = 0; R13 = 0;
LOOP(Iters, 2)
    {0} R0 = Load, {0} R1 = Load, {1} R12 = R10 * R12, {2} R3 =
    R3 + R2;
NEXT_STAGE(false)
    {0} R10 = Load, {0} R11 = Load, {1} R2 = R0 * R2, {2} R13 =
    R13 + R12;
NEXT_STAGE(true)
R3 = R3 + R13;
```

The following illustration provides an example wherein NUM_LANES=8, NUM_COUNTER_GROUPS=4, Iters=13, and PredCounter[0] are initially all zeros. Each stage is executed after its inputs have been computed in a lower numbered stage and each stage is initially executed in lanes 0 to 7 and subsequently in lanes 0 to 4 giving 13 iterations in all.

```
LOOP
    ItersRemaining = 5;
    StagesToFinish = 4
    PredCounter[0] = [ 0, 0, 0, 0, 0, 0, 0, 0]
    PredCounter[1] = [Max,Max,Max,Max,Max,Max,Max,Max]
    PredCounter[2] = [Max,Max,Max,Max,Max,Max,Max,Max]
    PredCounter[3] = [Max,Max,Max,Max,Max,Max,Max,Max]
        {0} R0 = Load, {0} R1 = Load, executed on lanes 0 to 7
            {1} R12 = R10 * R12, not executed
            {2} R3 = R3 + R2; not executed
NEXT_STAGE
    ItersRemaining = 0
    StagesToFinish = 3
    PredCounter[0] = [ 0, 0, 0, 0, 0,Max,Max,Max]
    PredCounter[1] = [ 0, 0, 0, 0, 0, 0, 0, 0]
    PredCounter[2] = [Max,Max,Max,Max,Max,Max,Max,Max]
    PredCounter[3] = [Max,Max,Max,Max,Max,Max,Max,Max]
        {0} R10 = Load, {0} R11 = Load, executed on lanes 0 to 4
            {1} R2 = R0 * R2, executed on all lanes
            {2} R13 = R13 + R12; not executed
NEXT_STAGE
    ItersRemaining = 0
    StagesToFinish = 2
    PredCounter[0] = [Max,Max,Max,Max,Max,Max,Max,Max]
    PredCounter[1] = [ 0, 0, 0, 0, 0,Max,Max,Max]
    PredCounter[2] = [ 0, 0, 0, 0, 0, 0, 0, 0]
    PredCounter[3] = [Max,Max,Max,Max,Max,Max,Max,Max]
        {0} R0 = Load, {0} R1 = Load, not executed
            {1} R12 = R10 * R12, executed on lanes 0 to 4
            {2} R3 = R3 + R2; executed on lanes 0 to 7
NEXT_STAGE
    ItersRemaining = 0
    StagesToFinish = 1
    PredCounter[0] = [Max,Max,Max,Max,Max,Max,Max,Max]
    PredCounter[1] = [Max,Max,Max,Max,Max,Max,Max,Max]
    PredCounter[2] = [ 0, 0, 0, 0, 0,Max,Max,Max]
    PredCounter[3] = [ 0, 0, 0, 0, 0, 0, 0, 0]
        {0} R10 = Load, {0} R11 = Load, not executed
            {1} R2 = R0 * R2, not executed
            {2} R13 = R13 + R12; executed on lanes 0 to 4
NEXT_STAGE
    ItersRemaining = 0
    StagesToFinish = 0
    PredCounter[0] = [ 0, 0, 0, 0, 0, 0, 0, 0]
    PredCounter[1] = [Max,Max,Max,Max,Max,Max,Max,Max]
    PredCounter[2] = [Max,Max,Max,Max,Max,Max,Max,Max]
    PredCounter[3] = [Max,Max,Max,Max,Max,Max,Max,Max]
        exit loop
```

Another example scheme for implementing predication on SIMD or vector processors includes the use of mask registers that include predicate bits. Each bit controls computation of an element of the result. Such a predication scheme can be used for sub-word SIMD and/or for SIMD with a register (SWAR) operations. Advantageously, the use of a predicate counter eliminates the need for separate predicate bits.

Nesting

Certain embodiments of the present specification also enable nesting of IF-ELSE-ENDIF and SIMD stage loop structures. To do so, the operations associated with the SIMD IF, ELSE, ENDIF, and stage loop primitives may be combined.

In one example embodiment, a SIMD stage loop is nested within an IF-ELSE-ENDIF region where Counter for stage 0 is used as a predicate. The initial state of the counter group for stage 0 is saved on entry to the loop, and then used to set that counter in each NEXT_STAGE operation and to restore the state on exit from the loop. Those lanes that are not enabled on entry to the loop will not be enabled.

In other example embodiments, IF-ELSE-ENDIF regions are nested within SIMD stage loops. In this case, the semantics are appropriate for an IF-ELSE-ENDIF block nested within a non-unrolled, non-software pipelined loop. Once the loop has been software pipelined, an ENDIF operation may be in a later stage than the corresponding IF or ELSE. In this case, it will modify a different predicate counter group. The ENDIF will thus erroneously cause the counter it modifies to be decremented. But all predicate counters except that for stage 0 may be initialized to MAX. If MAX is larger than the maximum number of stages possible the counters will not get decremented to zero. For example, consider this non-software pipelined loop:

```
LOOP(Iters)
    R0 = Load;
    IF R0 < 0;
        Store R0, ENDIF;
ENDLOOP
```

This loop may be software pipelined as follows:

```
LOOP(Iters, 1)
    {0} R0 = Load, {1} Store R0, {1} ENDIF;
    {0} IF R0 < 0;
NEXT_STAGE(true)
```

In the following example embodiment, NUM_LANES=8, NUM_COUNTER_GROUPS=4, Iters=13, and PredCounter[0] are initially all zeros. The Store in stage 1 is executed if the value loaded in stage 0 is less than zero.

```
LOOP
    ItersRemaining = 5
    StagesToFinish = 3
    PredCounter[0] = [ 0, 0, 0, 0, 0, 0, 0, 0]
    PredCounter[1] = [Max,Max,Max,Max,Max,Max,Max,Max]
    PredCounter[2] = [Max,Max,Max,Max,Max,Max,Max,Max]
    PredCounter[3] = [Max,Max,Max,Max,Max,Max,Max,Max]
        {0} R0 = Load, executed on lanes 0 to 7 (assume lane 3,5 &
            7 < 0)
            {1} Store R0, not executed
            {1} ENDIF; PredCounter[1] =
[Max−1,Max−1,Max−1,Max−1,Max−1,Max−1,Max−1,Max−1]
        {0} IF R0 < 0; PredCounter[0] = [ 1, 1, 1, 0, 1, 0, 1, 0]
NEXT_STAGE
    ItersRemaining = 0
    StagesToFinish = 2
    PredCounter[0] = [ 0, 0, 0, 0, 0, Max, Max, Max]
    PredCounter[1] = [ 1, 1, 1, 0, 1, 0, 1, 0]
    PredCounter[2] =
[Max−1,Max−1,Max−1,Max−1,Max−1,Max−1,Max−1,Max−1]
    PredCounter[3] = [ Max, Max, Max, Max, Max, Max, Max, Max]
        {0} R0 = Load, executed on lanes 0 to 4 (assume lane 2 < 0)
            {1} Store R0, executed on lanes 3, 5, and 7
            {1} ENDIF; PredCounter[1] = [ 0, 0, 0, 0, 0, 0, 0, 0]
        {0} IF R0 < 0; PredCounter[0] = [ 1, 1, 0, 1, 1, Max, Max,
            Max]
NEXT_STAGE
    ItersRemaining = 0
    StagesToFinish = 1
    PredCounter[0] = [ Max, Max, Max, Max, Max, Max, Max, Max]
    PredCounter[1] = [ 1, 1, 0, 1, 1, Max, Max, Max]
    PredCounter[2] = [ 1, 1, 1, 0, 1, 0, 1, 0]
    PredCounter[3] =
[Max−1,Max−1,Max−1,Max−1,Max−1,Max−1,Max−1,Max−1]
        {0} R0 = Load, not executed
            {1} Store R0, executed on lane 2
            {1} ENDIF; PredCounter[1] =
            [ 0, 0, 0, 0, 0,Max−1,Max−1,Max−1]
        {0} IF R0 < 0; PredCounter[0] =
[Max−1,Max−1,Max−1,Max−1,Max−1,Max−1,Max−1,Max−1]
```

-continued

```
NEXT_STAGE
    ItersRemaining = 0
    StagesToFinish = 0
    PredCounter[0] = [ 0, 0, 0, 0, 0, 0, 0, 0]
    PredCounter[1] = [Max,Max,Max,Max,Max,Max,Max,Max]
    PredCounter[2] = [Max,Max,Max,Max,Max,Max,Max,Max]
    PredCounter[3] = [Max,Max,Max,Max,Max,Max,Max,Max]
        exit loop
```

SIMD Within a Register

In an example embodiment, predicate counters are used to control SWAR instructions. An example SWAR machine may support fixed length vectors, where the length is element size*number of elements. When different element sizes are required, the predicate counter is configured to cope with different numbers of elements.

On an example machine containing n PEs, with each PE capable of executing/lanes of SWAR instructions, the predicate counter group contains n×l counters. Thus, each set of l counters controls the SWAR lanes on a single PE. When the element size is larger than the minimum lane width, and each PE is executing fewer than l lanes, then a single counter may be used as a predicate for each lane.

An IF operation with a condition having fewer than n*l elements can modify all counters, so predication of instructions with a different number of elements is predictable.

Different loops can be written for computation on different element sizes and different numbers of SWAR lanes per PE. In one example implementation where SWAR is supported, the LOOP primitive is redefined to take l as a parameter.

```
LOOP(Iters, Rest, SWARLanesPerPE) {
    NUM_LANES = NPE*NSWAR;
    counters_per_lane = NSWAR / SWARLanesPerPE;
    adjusted_iters = Iters * counters_per_lane;
    StagesToFinish = ceil(adjusted_iters/NUM_LANES) + Rest;
    ItersRemaining = adjusted_iters;
    SavedPredCounter = PredCounter[0];
    for (group=NUM_COUNTER_GROUPS-1; group>=1; group--)
        for(l=0; l<NUM_LANES; l++)
            PredCounter[group][l] = MAX_COUNTER_VAL;
    lanes_to_enable = min(NUM_LANES, ItersRemaining);
    for (l=0; l < lanes_to_enable; l++)
        PredCounter[0][l] = SavedPredCounter[l];
    for (l=lanes_to_enable; l < NUM_LANES; l++)
        PredCounter[0][l] = MAX_COUNTER_VAL;
    ItersRemaining = ItersRemaining – lanes_to_enable;
}
```

In this embodiment, pseudocode for the NEXT_STAGE primitive may remain as before.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, power-train systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smart-phones, tablets, security systems, personal computers (PCs), gaming technologies, virtual reality, simulation training, etc.

The various illustrative logical blocks, modules, cores, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, cores, and circuits may include antennas and/or transceivers to communicate with various components within the network or within the device. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules or cores may be implemented in some other manner as taught herein. Furthermore, the functionality described herein (e.g., with regard to one or more of the accompanying FIGURES) may correspond in some aspects to similarly designated "means for" functionality in the appended claims.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 USC section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A processor, comprising:
a processing element;
a sequencer configured to provide a conditionally-executable instructions to the processing element, wherein a condition is provided by a predicate encoded in a predicate counter; and
a predicate counter register configured to receive more than two meaningful values and to provide its value as the predicate counter;
wherein the processor includes circuitry to provide IF, ELSE, and ENDIF primitives that are dependent on the predicate counter;
wherein the IF primitive comprises: receiving a condition; if the predicate counter is not zero, incrementing the predicate counter; if the predicate counter is zero and the condition is false, setting the predicate counter to one;
wherein the ELSE primitive comprises: if the predicate counter is zero, setting the predicate counter to one; and if the predicate counter is one, setting the predicate counter to zero;
wherein the ENDIF primitive comprises: if the predicate counter is not zero, decrementing the predicate counter.

2. The processor of claim 1, further comprising:
a plurality of processing elements, wherein each processing element includes a predicate counter register, and wherein the processor is configured to operate in a single-instruction, multiple data (SIMD) mode.

3. The processor of claim 2, wherein:
each processing element is divided into a plurality of/lanes;
the processor is configured to operate in SIMD-within-a-register mode; and
the processor further comprises a predicate counter group, wherein the predicate counter group contains at least n×l predicate counters, where n is the number of processing elements.

4. The processor of claim 1, wherein the processor is configured to operate in a single-instruction, multiple-data within a register mode.

5. The processor of claim 1, wherein the processor includes circuitry to implement LOOP and NEXT_STAGE primitives, wherein:
the LOOP primitive is configured to be executed before the first instruction of an unrolled stage loop; and
the NEXT_STAGE primitive is configured to be executed between stages of a pipelined stage loop.

6. The processor of claim 5, wherein the LOOP primitive is configured to operate in a single-instruction, multiple-data-within-a-register (SWAR) mode, and wherein the LOOP primitive is configured to receive as a parameter a number of SWAR lanes.

7. A method performed by a computer, comprising:
receiving an instruction having associated therewith a predicate counter configured to receive more than two useful values;
if the predicate counter is a first value, executing the instruction; and
if the predicate counter is not the first value, ignoring the instruction;
executing IF, ELSE, and ENDIF primitives that are dependent on the predicate counter;
wherein: the IF primitive comprises: receiving a condition; if the predicate counter is not zero, incrementing the predicate counter; if the predicate counter is zero and the condition is false, setting the predicate counter to one;
the ELSE primitive comprises if the predicate counter is zero, setting the predicate counter to one; and if the predicate counter is one, setting the predicate counter to zero; and
the ENDIF primitive comprises: if the predicate counter is not zero, decrementing the predicate counter.

8. The method of claim 7, wherein the first value is zero.

9. The method of claim 7, wherein the first value is selected from the group consisting of zero, one, MAXINT, −MAXINT, infinity, negative infinity, and not-a-number.

10. The method of claim 7, further comprising:
if the predicate counter is not the first value, taking additional action.

11. The method of claim 7, further comprising:
executing a LOOP before the first instruction in a pipelined stage loop and a NEXT_STAGE primitive between stages of the unrolled loop, execution of the LOOP primitive and NEXT_STAGE primitive each being dependent on the predicate counter.

12. A non-transitory tangible computer-readable medium having stored thereon software instructions that, when executed, instruct a processor to:
read a predicate counter, the predicate counter having more than two useful values;
read a conditional instruction;
if the predicate counter is a first value, execute the instruction;
if the predicate counter is not the first value, ignore the instruction and manipulate the predicate counter based on the value of the predicate counter; and
executing IF, ELSE, and ENDIF primitives that are dependent on the predicate counter; wherein: the IF primitive comprises: receiving a condition; if the predicate counter is not zero, incrementing the predicate counter; if the predicate counter is zero and the condition is false, setting the predicate counter to one; the ELSE primitive comprises if the predicate counter is zero, setting the predicate counter to one; and if the predicate counter is one, setting the predicate counter to zero; and the ENDIF primitive comprises: if the predicate counter is not zero, decrementing the predicate counter.

13. The tangible computer-readable medium of claim 12, wherein the manipulation is selected from the group consisting of incrementing, decrementing, and maintaining the value of the predicate counter.

14. The tangible computer-readable medium of claim 12, further comprising a nested conditional branch configured to conditionally execute instructions based on a Boolean condition and on an integer nesting level indicated by the predicate counter.

15. The tangible computer-readable medium of claim 12, further comprising an unrolled stage loop having a LOOP primitive at the head of the stage loop and a NEXT_STAGE primitive between each stage of the stage loop.

16. The tangible computer-readable medium of claim 12, further comprising instructions using the predicate counter within a single-instruction, multiple-data-within-a-register operation.

* * * * *